US 8,228,527 B2
Jul. 24, 2012

(12) United States Patent
Winter et al.

(10) Patent No.: US 8,228,527 B2
(45) Date of Patent: Jul. 24, 2012

(54) SYSTEM AND METHOD FOR PRINTING AND SCANNING A USER-COMPLETED DIGITAL STILL CAMERA IMAGE PROOF SHEET AND ORDER FORM

(75) Inventors: Kirt A. Winter, Woodinville, WA (US); Yoav Epstein, San Diego, CA (US); William C. Hilliard, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 2258 days.

(21) Appl. No.: 10/821,490

(22) Filed: Apr. 9, 2004

(65) Prior Publication Data

US 2004/0190059 A1    Sep. 30, 2004

Related U.S. Application Data

(63) Continuation of application No. 09/995,869, filed on Nov. 29, 2001, now Pat. No. 6,744,529, which is a continuation of application No. 09/173,050, filed on Oct. 15, 1998, now abandoned.

(51) Int. Cl.
*G06K 15/02* (2006.01)

(52) U.S. Cl. .......... 358/1.15; 358/1.12; 358/1.18; 355/40

(58) Field of Classification Search .......... 358/1.12, 358/1.15, 1.18; 355/40
See application file for complete search history.

(56) References Cited

U.S. PATENT DOCUMENTS

| | | | | |
|---|---|---|---|---|
| 3,959,784 A * | 5/1976 | Meier | | 365/115 |
| 4,441,807 A * | 4/1984 | Bartz | | 355/40 |
| 5,103,406 A * | 4/1992 | Hirayama | | 709/246 |
| 5,124,742 A * | 6/1992 | Yoshikawa | | 355/27 |
| 5,178,417 A * | 1/1993 | Eshoo | | 283/67 |
| 5,359,387 A * | 10/1994 | Hicks | | 355/40 |
| 5,398,131 A * | 3/1995 | Hall et al. | | 359/465 |
| 5,426,481 A * | 6/1995 | Slater et al. | | 396/661 |
| 5,511,771 A * | 4/1996 | Rubscha | | 271/4.01 |
| 5,583,629 A * | 12/1996 | Brewington et al. | | 399/302 |
| 5,805,777 A * | 9/1998 | Kuchta | | 358/1.13 |
| 5,812,178 A * | 9/1998 | Yamaguchi | | 347/251 |
| 5,907,391 A * | 5/1999 | Kobayashi et al. | | 355/40 |
| 6,141,111 A * | 10/2000 | Kato | | 358/1.15 |
| 6,181,409 B1 * | 1/2001 | Calhoun | | 355/39 |

* cited by examiner

*Primary Examiner* — David K. Moore
*Assistant Examiner* — Peter K Huntsinger

(57) ABSTRACT

A digital still camera is used for taking and storing digital representations of a plurality of images. A printer, such as an ink jet printer or a laser printer, is used for generating graphical representations of selected ones of the plurality of images on a preselected print media such as a paper. A flash memory card, floppy diskette, direct data link or some other data transfer scheme is used to transfer the digital representations of the plurality of images from the digital still camera to the printer. The printer includes programming for generating a combination proof sheet and order form. The combination proof sheet and order form can include an array of thumbnail images and a plurality of image selection and/or image enhancement user designation areas such as bubbles to be filled in by the user with a pencil. The printer includes a scanner and related circuitry and software for scanning the combination proof sheet and order form to detect the user designation areas completed by the user. The programming in the printer thereafter causes it to generate at least one final print sheet with the images and enhancements designated by the user on the combination proof sheet and order form. The proof sheet and order form can be used to designate the number of final prints of a selected image, the size and/or cropping of the prints, the brightness, color balance, background, borders and so forth.

65 Claims, 7 Drawing Sheets

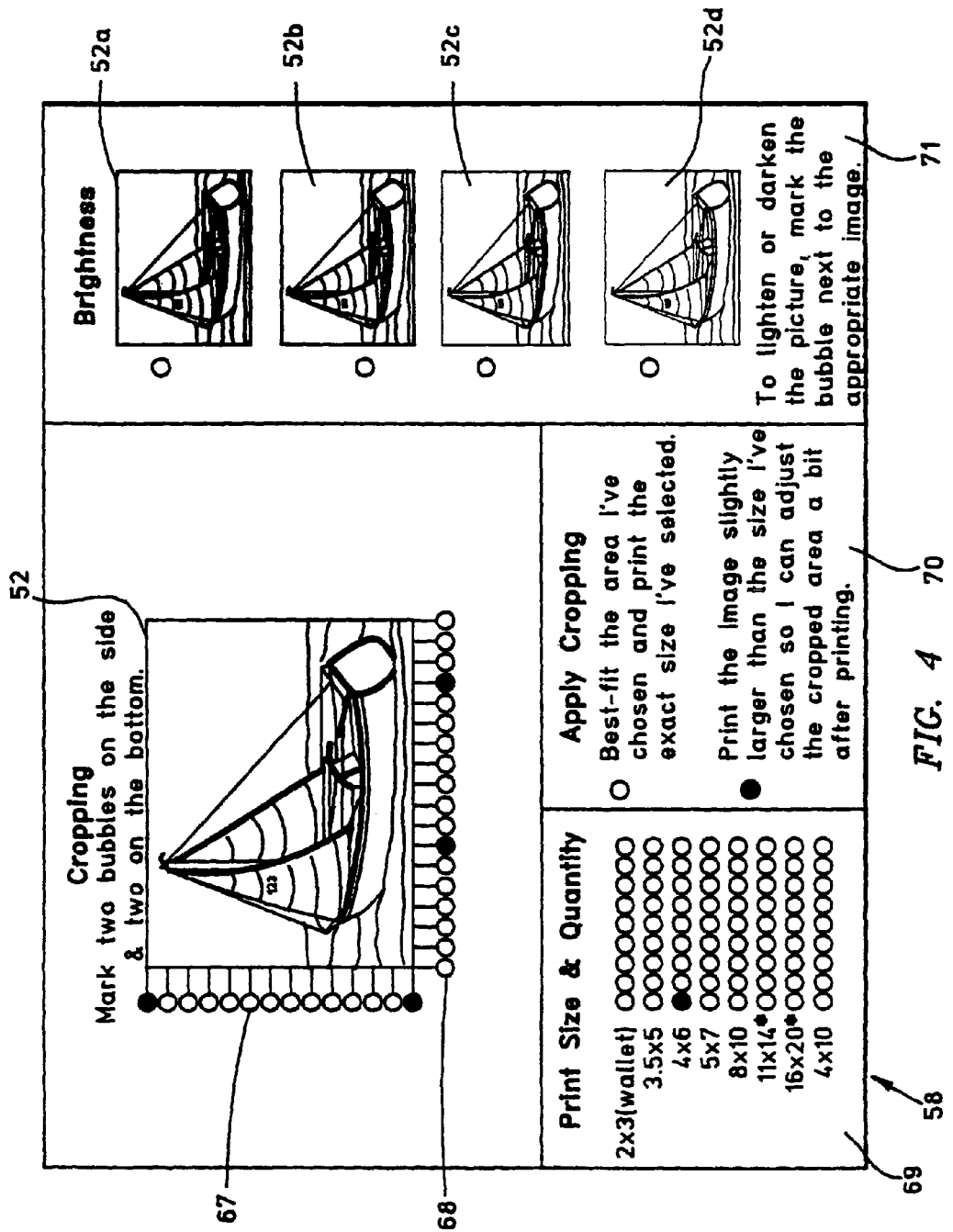

SYSTEM AND METHOD FOR PRINTING AND SCANNING A USER-COMPLETED DIGITAL STILL CAMERA IMAGE PROOF SHEET AND ORDER FORM

CROSS-REFERENCE TO RELATED APPLICATIONS

This application is a continuation of U.S. patent application Ser. No. 09/995,869, by Winter et al., filed Nov. 29, 2001 now U.S. Pat. No. 6,744,529, titled "System and Method for Printing and Scanning a User-Completed Digital Still Camera Image Proof Sheet and Order Form" which in turn is a continuation of U.S. patent application Ser. No. 09/173,050, by Winter et al., filed Oct. 15, 1998 (abandoned), titled "System and Method for Printing and Scanning a User-Completed Digital Still Camera Image Proof Sheet and Order Form". All of these applications are assigned to the assignee of the present invention and are hereby incorporated by reference in their entirety.

BACKGROUND OF THE INVENTION

The present invention relates to electronic photography, and more particularly, to a system and method for enabling a user to easily select and enhance one or more images taken by a digital still camera for printing without using a personal computer or some other complex user interface.

Digital still cameras (DSCs) are rapidly gaining popularity with consumers. They permit high resolution color images to be stored for subsequent printing by conventional ink jet and laser printers. The quality of the color prints that are produced approaches that of conventional silver halide photographic prints. More importantly, the digital images can be permanently stored on different forms of media such as compact disks (CDs), manipulated and altered in a personal computer (PC), inserted into computer graphics and word processing programs, sent to friends and relatives via e-mail, and transmitted over the Internet as part of web pages. From an environmental standpoint digital still cameras are attractive because they eliminate the need for chemical developer solutions.

Commercially available digital still cameras typically have a removable data storage media such as floppy diskette or a flash memory card onto which the digital representation of the images captured by the camera optics and charge coupled device (CCD) can be stored. These forms of media may be removed and plugged into a personal computer so that the digital representations of the images may be viewed. The personal computers may be provided with digital still camera image processing software for enhancing the color balance, contrast, borders and other characteristics of the images prior to storage, printing or transmission. Typically the image processing software that runs on the personal computer allows certain images to be selected and others discarded or ignored.

Other digital still cameras have been developed that may be coupled directly to a printer. These cameras are desirable for consumers who do not own personal computers or feel uncomfortable using such computers. The command buttons and graphical user interface (GUI) menus on such a camera's liquid crystal display (LCD) are used in accordance with a pre-programmed protocol to select the images to be printed. This type of digital still camera image selection and printing system has the advantage of not requiring a personal computer. It is normally undesirable to print all images, because some are usually poor in quality, and printing all images results in wasted time, paper and ink or laser toner. However, the user is faced with a complex and bewildering set of commands for selecting, downloading and printing images. As an alternative, the printer itself can be provided with a user interface for selecting images from a digital still camera. However this is undesirable because the printer ends up having user-unfriendly interface software. With either approach for coupling a digital still camera directly to a printer, without a PC interface, it is very tedious and cumbersome to vary the characteristics of the selected images to be printed, such as size, brightness, cropping, etc. For the sake of simplicity, such characteristics, along with others, are generally referred to herein as something that will "enhance" the original image taken by the digital still camera.

It would therefore be desirable to provide a system and method for enabling a user to easily select and enhance one or more images taken by a digital still camera for printing without using a personal computer or some other complex user interface normally required in a camera-direct-to-printer environment.

SUMMARY OF THE INVENTION

It is therefore the primary object of the present invention to provide a system for enabling a user to easily select and enhance one or more images taken by a digital still camera for printing without using a personal computer or a complex user interface normally required in a camera-direct-to-printer environment.

It is another object of the present invention to provide a method for enabling a user to easily select and enhance one or more images taken by a digital still camera for printing without using a personal computer or a complex user interface normally required in a camera-direct-to-printer environment.

Still another object of the present invention is to provide a combination proof sheet and order form including a graphical representation of at least one of a plurality of images taken by a digital still camera, the proof sheet and order form having a plurality of image selection and/or image enhancement user designation areas on the form that can be completed by a user and thereafter scanned and detected by a printer as a set of instructions that cause the printing of the chosen number of final prints in the desired quantity, size, brightness and so forth.

In accordance with the present invention a system is provided for enabling a user to select and print digitally stored images. A digital still camera is used for talking and storing digital representations of a plurality of images. A printer is used for generating graphical representations of selected ones of the plurality of images on a preselected print media. A flash memory card, floppy diskette, direct data link or some other conventional data transfer scheme is used to transfer the digital representations of the plurality of images from the digital still camera to the printer. The printer includes programming for generating a combination proof sheet and order form. The combination proof sheet and order form includes a graphical representation of at least one of the images and a plurality of user designation areas. The printer has circuitry and software for detecting the user designation areas on the form that have been completed by the user. The programming in the printer thereafter causes it to generate at least one final print sheet with the images and enhancements designated by the user on the combination proof sheet and order form.

In accordance with the present invention a method is provided for enabling a user to select and print digitally stored images. The method involves the steps of: 1) taking and storing digital still representations of a plurality of images; 2) transferring the digital still representations of the plurality of images to a printer capable of generating graphical representations of selected ones of the plurality of images on a preselected print media; 3) generating with the printer a combination proof sheet and order form including a graphical representation of at least one of the images and a plurality of image selection and/or image enhancement user designation areas; 4) completing at least one of the user designation areas on the combination proof sheet and order form; 5) using the printer to read the combination proof sheet and order form to determine the user designation areas completed by the user; and 6) generating with the printer at least one final print sheet with the images and enhancements designated by the user on the combination proof sheet and order form.

BRIEF DESCRIPTION OF THE DRAWINGS

FIGS. 3A-3F illustrate a combination proof sheet and order form that may be utilized with the system of FIG. 1 to select one or more of an array of thumbnail images for final printing.

FIG. 4 illustrates a custom proof sheet and order form that may be utilized with the system of FIG. 1 in cropping a single image and selecting the brightness thereof for final printing.

DESCRIPTION OF THE PREFERRED EMBODIMENTS

Figure 1:
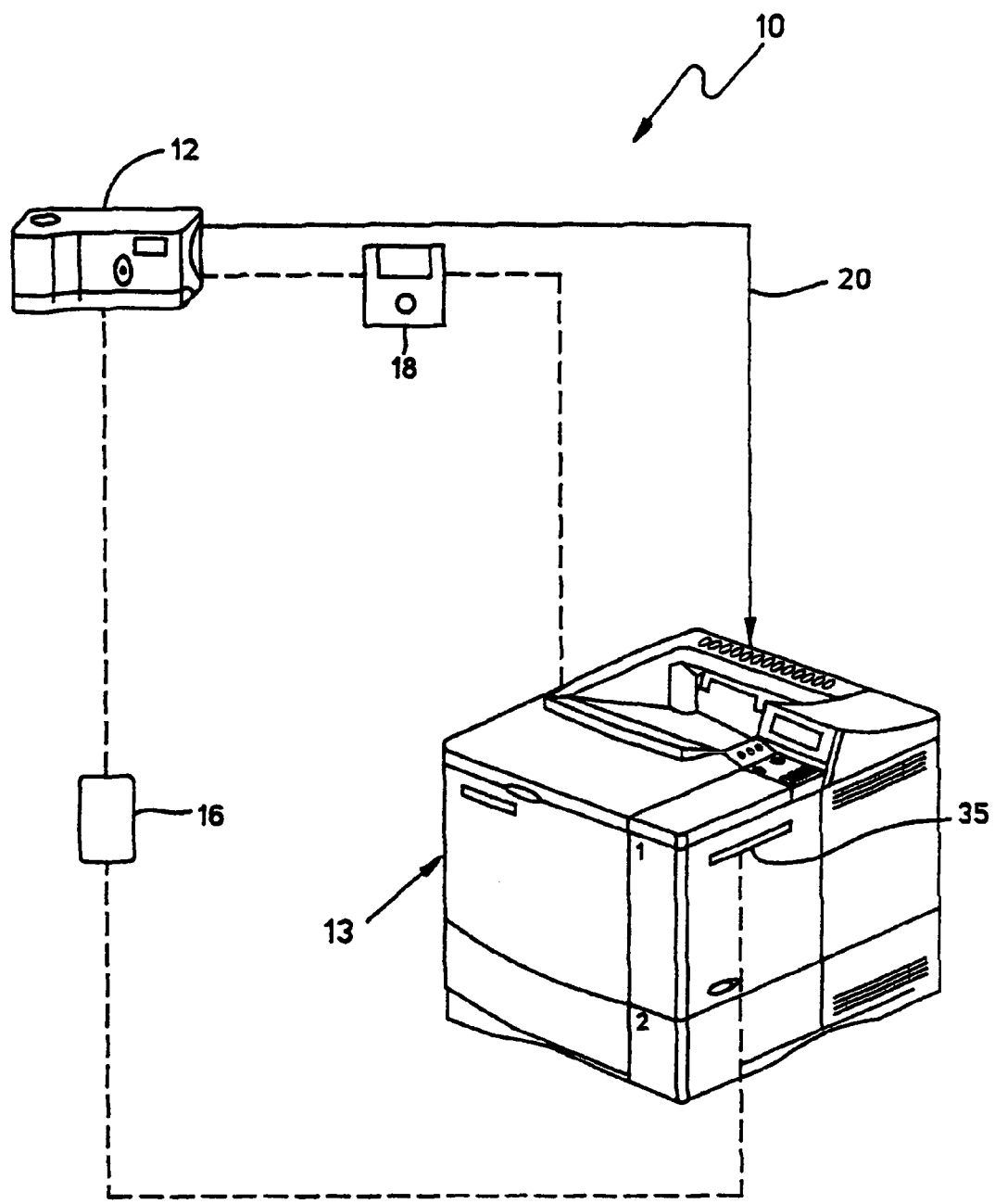
FIG. 1 is a diagrammatic illustration of a system for enabling a user to select and print digitally stored images in accordance with a preferred embodiment of the present invention.

Referring to FIG. 1, in accordance with the present invention a system 10 is provided for enabling a user to select and print digitally stored images. A conventional digital still camera 12 is used for taking and storing digital representations of a plurality of images. A laser printer 13 is used for generating graphical representations of selected ones of the plurality of images on a preselected print media. A flash memory card 16, floppy diskette 18, direct data link 20, wireless data link (not illustrated) or some other well known digital data transfer scheme is used to transfer the digital representations of the plurality of images from the digital still camera 12 to the laser printer 13.

Figure 3A:
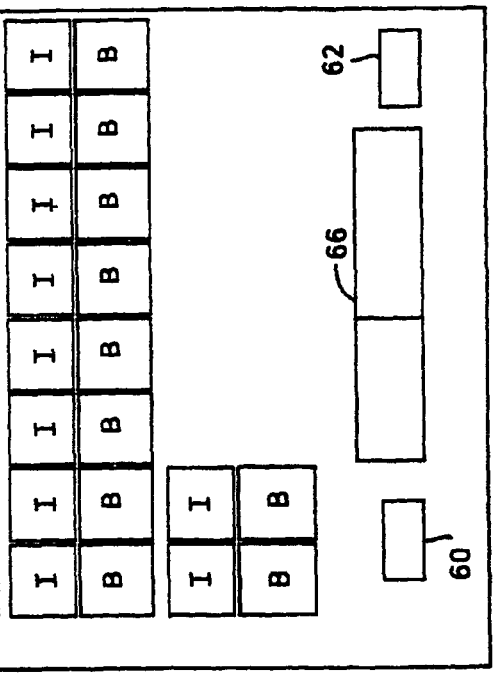

The laser printer 13 includes firmware programming for generating a combination proof sheet and order form 22 (FIG. 3A). As will be described later on in great detail, the combination proof sheet and order form 22 includes a graphical representation of at least one of the images and a plurality of image selection and/or image enhancement user designation areas.

It should be understood that the system of FIG. 1 can be used with an ink jet printer instead of a laser printer. Other types of printers could be utilized such as a dot matrix printer, dye sublimation printer, or thermal printer, provided they are capable of coloration and pixel density that will produce a suitable quality image. All that is necessary is that the printer have the electro-mechanical features, circuitry and firmware required to perform the functions described hereafter.

Figure 2:
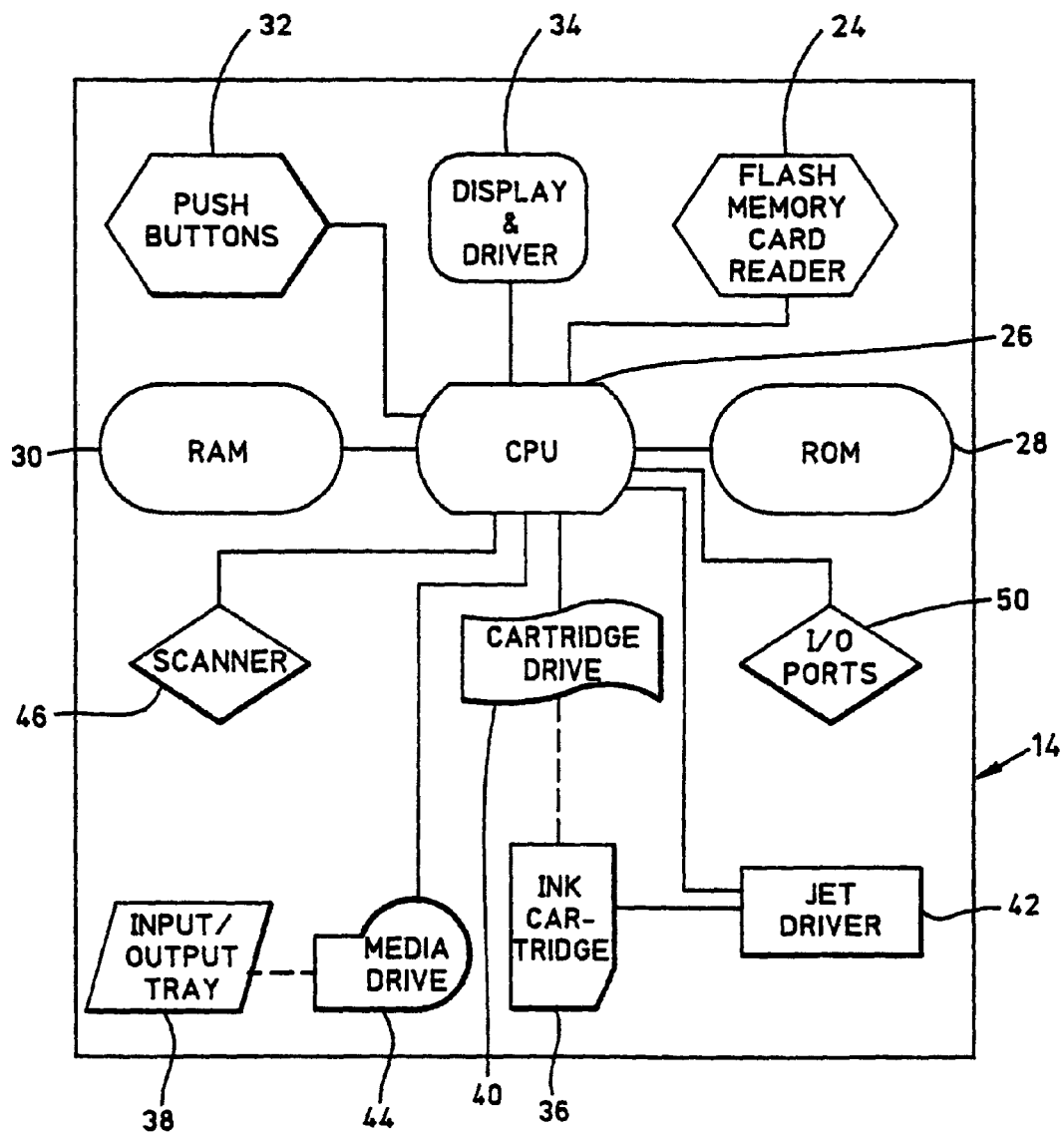
FIG. 2 is a functional block diagram of a printer that may be used in the system of FIG. 1.

FIG. 2 illustrates an ink jet printer 14, in functional block diagram form, that may be utilized in the system 10 of FIG. 1 in place of the laser printer 13. The ink jet printer 14 includes, for example, a reader 24 into which the flash memory card 16 may be removably inserted. Alternatively, the ink jet printer 14 could be equipped with a floppy disk drive or a wireless data transceiver. The flash memory card reader 24 is connected to a central processing unit (CPU) 26 which uses programs stored in a read only memory (ROM) 28 to download the digital representations of the images into a random access memory (RAM) 30. Pushbuttons 32 are manually selectively depressed by the user in a protocol directed by alphanumeric prompts, icons and/or other GUI indicated on an LCD display 34 and associated driver circuitry to cause the printer 14 to generate the combination proof sheet and order form 22 (FIG. 3A). In FIG. 1, the laser printer 13 has a slot or bezel 35 which allows insertion of the flash memory card 16 into a flash memory card reader.

An ink jet cartridge 36 (FIG. 2) is transversely reciprocated back and forth in the ink jet printer 14 while a sheet of print media such as plain paper located in an input/output media tray 38 is longitudinally advanced through the inkjet printer 14. An electromechanical cartridge drive mechanism 40 is controlled by the CPU 26 for moving the ink jet cartridge 36 transversely across the paper as required. The CPU 26 controls the ink jet cartridge 36 through a jet driver circuit 42. An electromechanical media drive mechanism 44 is connected to the CPU 26 for advancing the sheet of paper longitudinally through the ink jet printer 14.

The user manually completes selected user designation areas on the proof sheet and order form 22 (FIG. 3A), such as by marking thereon with a marking implement such as a pencil or a pen. This permits the user to select which images to send to final printing, image quantity, image brightness, image cropping, etc. The completed proof sheet and order form 22 is then manually re-inserted into the input/output media tray 38 (FIG. 2) of the ink jet printer 14. The user then pushes one or more of the push buttons 32 on the ink jet printer 14 to cause the media drive mechanism 44 to draw the now-completed form 22 from the tray 38 back through the ink jet printer 14. Alternatively, the printer 14 can detect the re-insertion of the order form 22 and automatically start printing the final print sheet(s).

Figure 5:
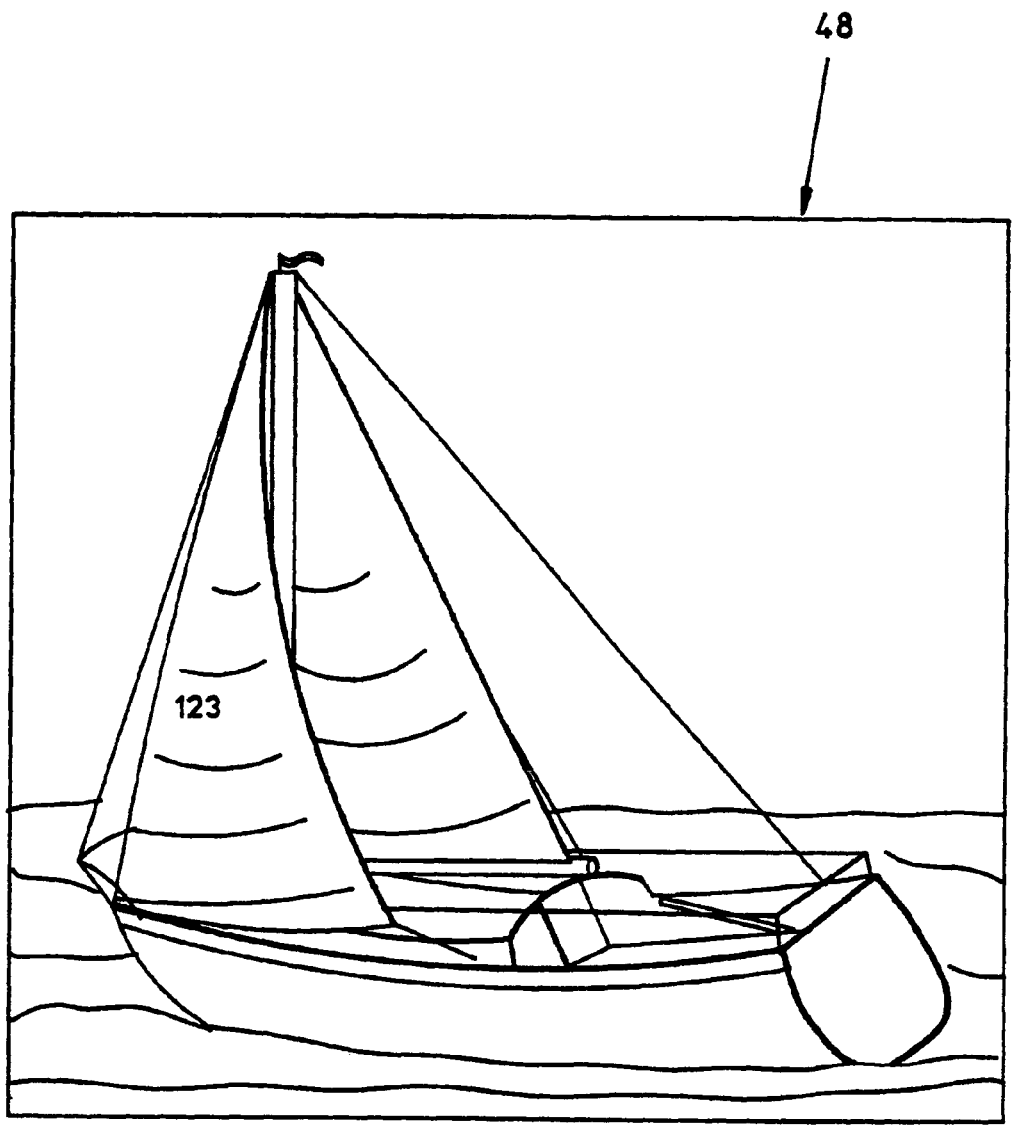
FIG. 5 illustrates an exemplary final print sheet with an image having the size, brightness and cropping designated by the user on the custom proof sheet and order form of FIG. 4.

A scanner 46 (FIG. 2) including circuitry and software is mounted in the ink jet printer 14. The scanner 46 may, for example, include a high intensity illumination source (not illustrated) and an array of photo detectors (not illustrated) mounted adjacent the path of the proof sheet and order form 22 as it is conveyed longitudinally through the ink jet printer 14. Alternatively, the scanner 46 can incorporate the exiting paper edge sensors that are already in some printer. Some ink jet printers have sensors for detecting the type of media and the activation energy for the ink jet pen. These sensors can be used to detect completed user designation areas. The scanner 46 is used to detect the user designation areas completed by the user on the proof sheet and order form 22. This information is conveyed to the CPU 26 for storage in the RAM 30. Programming stored in the ROM 28 is used by the CPU 26 to generate at least one final print sheet 48 (FIG. 5). As discussed hereafter in detail the final print sheet or sheets have the images and enhancements (e.g. size, cropping, brightness, etc.) designated by the user on the combination proof sheet and order form 22.

The inkjet printer 14 (FIG. 2) is also provided with a plurality of input/output (I/O) ports 50 for connecting cables such as the direct data link 20 to the digital still camera 12 (FIG. 1) and to a personal computer (not illustrated). The ink jet printer could have a wireless data transceiver for communicating with the digital still camera, such as an infrared based system widely used with 8 mm VCR cameras to communicate with their remote controls.

FIG. 3A is a detailed plan view of an exemplary combination proof sheet and order form 22 that may be utilized with the system 10 of FIG. 1 to select one or more images from an array of thumbnail images such as 52 (FIG. 3C) for final printing. By way of example, there are twenty-five thumbnail images labeled "I" in FIG. 3A arranged in an array of four rows and eight columns on the form 22. The term "thumbnail" is a term of convenience used to describe printed graphical representations of reduced size and/or quality that are sufficiently small so that an array of the same can be printed on a single sheet of paper for simultaneous viewing and evaluation by a user. The thumbnail images I are preferably printed in color, although they could be black and white. They are made up of microscopic pixels of color pigment applied in a well known manner to achieve the image definition, tone, shading, resolution and other image characteristics required. The thumbnail image 52 and the image on the final print sheet 48 (FIG. 5) have been shown as line drawings due to the limitations imposed on permissible patent drawings.

It will be understood that the thumbnail images I are typically of lower quality than the final print images The thumbnail images are displayed in an array to allow the user to quickly and easily select which of the digitally stored images transferred from the camera 12 that he or she wants to print or save in final, higher quality form.

The combination proof sheet and order form 22 (FIG. 3A) includes image selection user designation areas such as 54 (FIG. 3C) adjacent each of the thumbnail images I. The user designation areas 54 include rows and columns of bubbles 56 that can be manually filled in by a user with a pen or a pencil. Other discrete regions could be utilized as user designation areas such as vertical stripes or slots between two adjacent vertical bars. The user designation areas could consist of discrete bounded regions in which a user could write in print or cursive form numbers, digits or symbols that could be read with optical character recognition (OCR) software. Alternatively, a user could punch out holes or apply stickers or conductive markers. Besides optical scanning, the printer could use electrical or mechanical detection of the completed user designation areas. The user designation areas 54 of the form 22 also include user readable printed indicia in the form of the column headings "Size" and "Qty" (quantity) in addition to row headings "3.5×5", "4×6", "5×7", "8×10" and "Cstm". The user designation areas are labeled "B" in FIG. 3A. The user can fill in one or more bubbles 56 in the user designation area B adjacent a particular thumbnail image I to "order" the desired number and size of final prints of that digitally stored image. Filling in the bubble next to "Cstm" causes the ink jet printer 14 to generate the custom proof sheet and order form 58 (FIG. 4) for that particular thumbnail image on a single sheet of paper. The layout and use of the custom form 58 will be described in detail later on.

Figure 3F:
Figures 3B, 3C:
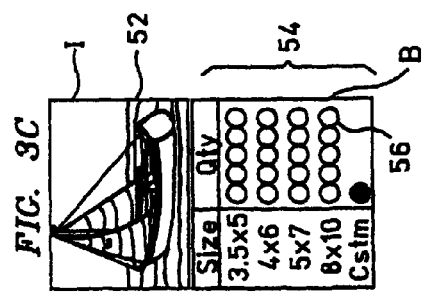
Figure 3D:
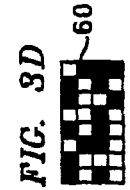

Referring again to FIG. 3A, the combination proof sheet and order form 22 further includes a first identity marker 60 and a second identity marker 62. Each of these identity markers may take the form of a checkerboard grid as shown in FIGS. 3D and 3F. Each identity marker 60 and 62 has a unique pattern that is associated with the set of digital images that have been used to generate the proof sheet and order form 22. The markers 60 and 62 thus identify the contents of, for example, the flash memory card 16. When the completed form 22 is re-inserted into the inkjet printer 14, the identity markers 60 and 62 are scanned and compared to a code associated with the set of digital images currently stored in the printer 14 and/or flash memory card 16 residing therein. If there is no match, the user is warned via message on the display 34. This prevents the system from printing images and/or user designated enhancements from a reinserted form that do not correspond to the digital images currently available to the printer.

An "All Pictures" user designation area 64 (FIGS. 3A and 3B) is printed on the upper left corner of the form 22. It has no thumbnail image but has the Size and Qty indicia and associated bubbles to allow the user to order that all portrayed thumbnail images I be printed in particular sizes and quantities. Finally, the combination proof sheet and order form 22 also includes a "Select pictures for storage" user designation area 66 (FIGS. 3A and 3E) with associated indicia and bubbles. This feature allows the user to designate that all images, all images designated for final printing, or no images are to be permanently stored in the memory of the ink jet printer 14 or in a PC connected to the ink jet printer 14, or in some other permanent fashion.

The ink jet printer 14 could have a cache memory larger than that normally found in the camera 12 but smaller than the RAM memory of a PC connected to the ink jet printer 14. The ink jet printer 14 could be programmed to store the images transferred from the camera 12 and after reading the completed order form 22, transfer selected images to the PC for permanent storage when the printer detects that the PC has powered up. This empties the RAM 30 of the ink jet printer 14 for receiving new images.

FIG. 4 is a plan view of the custom proof sheet and order form 58 that may be utilized with the system of FIG. 1 in cropping a single image and selecting the brightness thereof for final printing. Print size, print quantity and picture brightness may also be selected via the custom order form 58. The custom order form 58 includes a substantially enlarged version 52' of the thumbnail corresponding image on the form 22 whose "custom" bubble 56 was previously filled in. Again the image 52' has been shown diagrammatically in FIG. 4 due to the limitations on the permissible form of patent drawings. In reality, the image 52' would be a graphical image printed on the form 58 via a complex pattern of tiny pixels. A series of equally spaced bubbles 67 and a series of equally spaced bubbles 68 along the left vertical and bottom horizontal side edges, respectively, of the enlarged image 52' may be filled in by the user to crop the image 52'. In FIG. 4 two of the bubbles 67 and two of the bubbles 68 have been filled in or darkened to give an example of the manner in which a user would designate cropping, which is one form of image enhancement described herein. The indicia or notation "Cropping—Mark two bubbles on the side & two on the bottom" appears above the enlarged thumbnail image 52' on the custom form 58.

The custom proof sheet and order form 58 (FIG. 4) further includes a "Print Size & Quantity" user designation area 69 similar to the user designation area 54 of the form 22 except that the former includes additional print sizes such as "2×3 (wallet)", "11×14", "16×20" and "4×10". In addition, the custom proof sheet and order form 58 also includes a user designation area 70 labeled "Apply Cropping". By fining in the appropriate bubble, this feature enables the user to best-fit the designated cropping to the selected print size. Such a feature is necessary because the rectangular proportions of the cropping selected by the user in filling in selected ones of the bubbles 67 and 68 along the borders of the enlarged thumbnail image 52' may not match the rectangular proportions of the print size selected with the user designation area 69. Alternatively, this feature enables the user to specify that the final print of the selected image should be larger than the print size selected so that further cropping can take place on the next printing or the user can simply use scissors to cut a print down to the desired size.

The custom proof sheet and order form 58 (FIG. 4) further includes a "Brightness" user designation area 71 on the right hand side thereof This area includes four thumbnail images 52*a*, 52*b*, 52*c* and 52*d* with progressively less brightness in the actual graphic printing of these images. The user fills in the bubble adjacent one of the four thumbnail images 52*a*, 52*b*, 52*c* or 52*d* to select the level of brightness desired in the final print using the diet brightness levels depicted. Brightness is another form of image enhancement referred to herein.

Figure 6A:
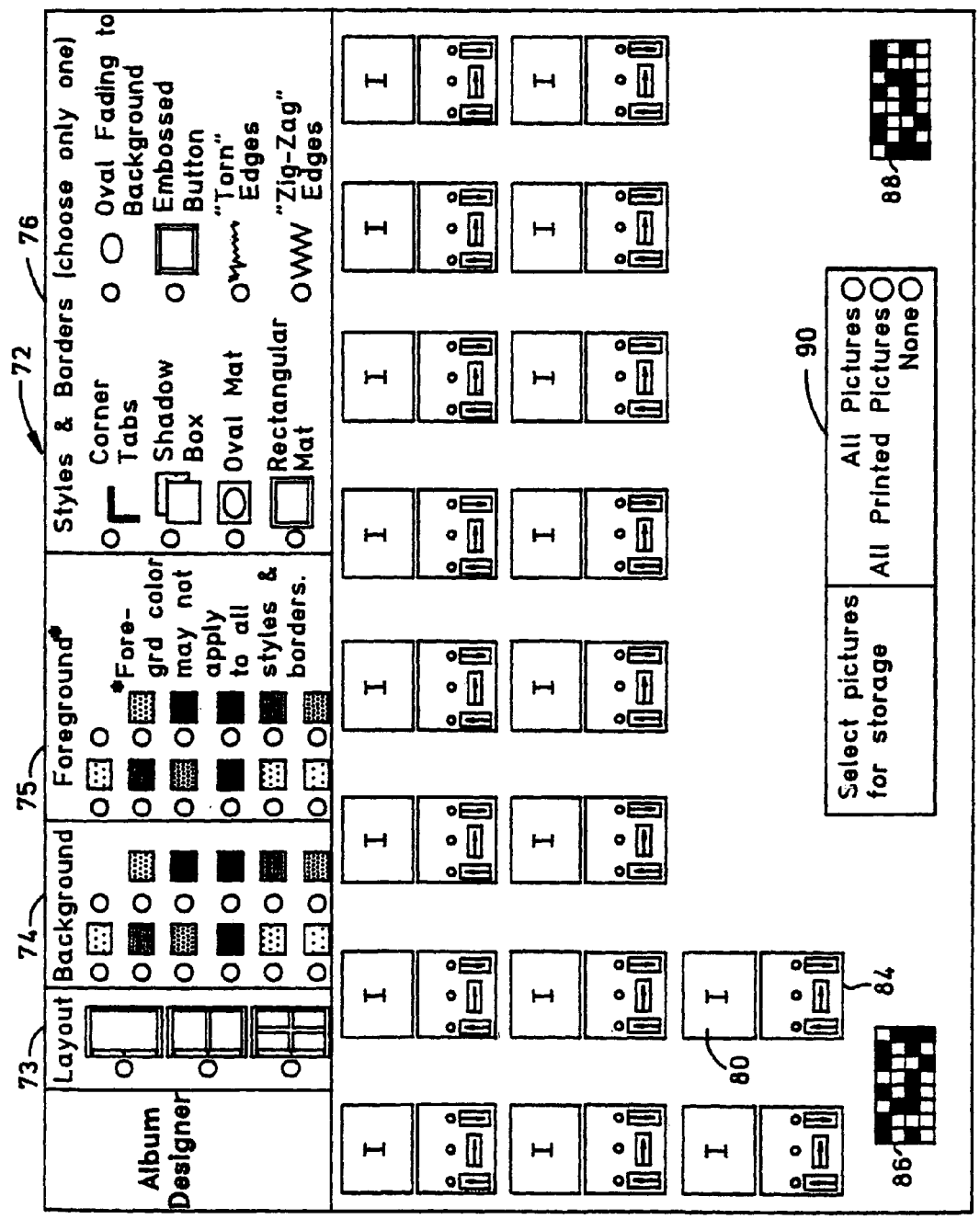
FIGS. 6A and 6B illustrate an alternate combination proof sheet and order form that may be utilized with the system of FIG. 1 in designing and printing pages for a digital photo album.

FIG. 6A is a plan view of an alternate proof sheet and order form 72 that may be utilized with the system of FIG. 1 in designing and printing pages for a digital photo album. The album form 72 is preferably printed on a single sheet of paper in response to the pressing of one or more of the push buttons 32 on the ink jet printer 14 or by filling in a bubble on one of the forms 22 or 58. The album form 72 includes user designation areas 73 for image "Layout", 74 for "Background", 75 for "Foreground" and 76 for "Styles & Borders". Each of these user designation areas presents relevant choice options, each having an adjacent bubble that can be filled in or completed to designate a choice. The choices available and their purposes are evident from FIG. 6A and need not be further described. The album form 72 further includes plurality of thumbnail images such as 80 (FIG. 6B) each having adjacent "Add to album" and "Rotate Image" designation options 82 and 84 for the corresponding thumbnail image. Again, due to the restrictions on patent drawings, the thumbnail images I cannot be shown in their true color graphical form in FIGS. 6A and 6B. The images are shown as boxes labeled I in FIG. 6A and as a line drawing in FIG. 6B. It will be understood that in FIG. 6A each thumbnail image I is shown with its adjacent user designation area below the same that permits the user to add the image to the album and rotate the same. Identity markers 86 and 88 (FIG. 6A) on the album form 72 serve the same function as the identity markers 60 and 62 (FIG. 3A) of the form 22. A "Select pictures for storage" user designation area 90 (FIG. 6A) on the album form 72 permits the user to select, by filling in the appropriate bubble, "All pictures", "All printed pictures" or "none" for permanent storage.

It will be apparent to those skilled in the art that other forms of image enhancement could be selected on the forms 22, 58 and 72 such as color balance. In addition, if date information has been stored when each image was taken, the user could designate on an order form that the final print is to include a superimposed picture date. Many other possibilities and combinations for image selection and/or image enhancement will occur to those skilled in the art and need not be specifically described herein.

Figures 6B, 7:
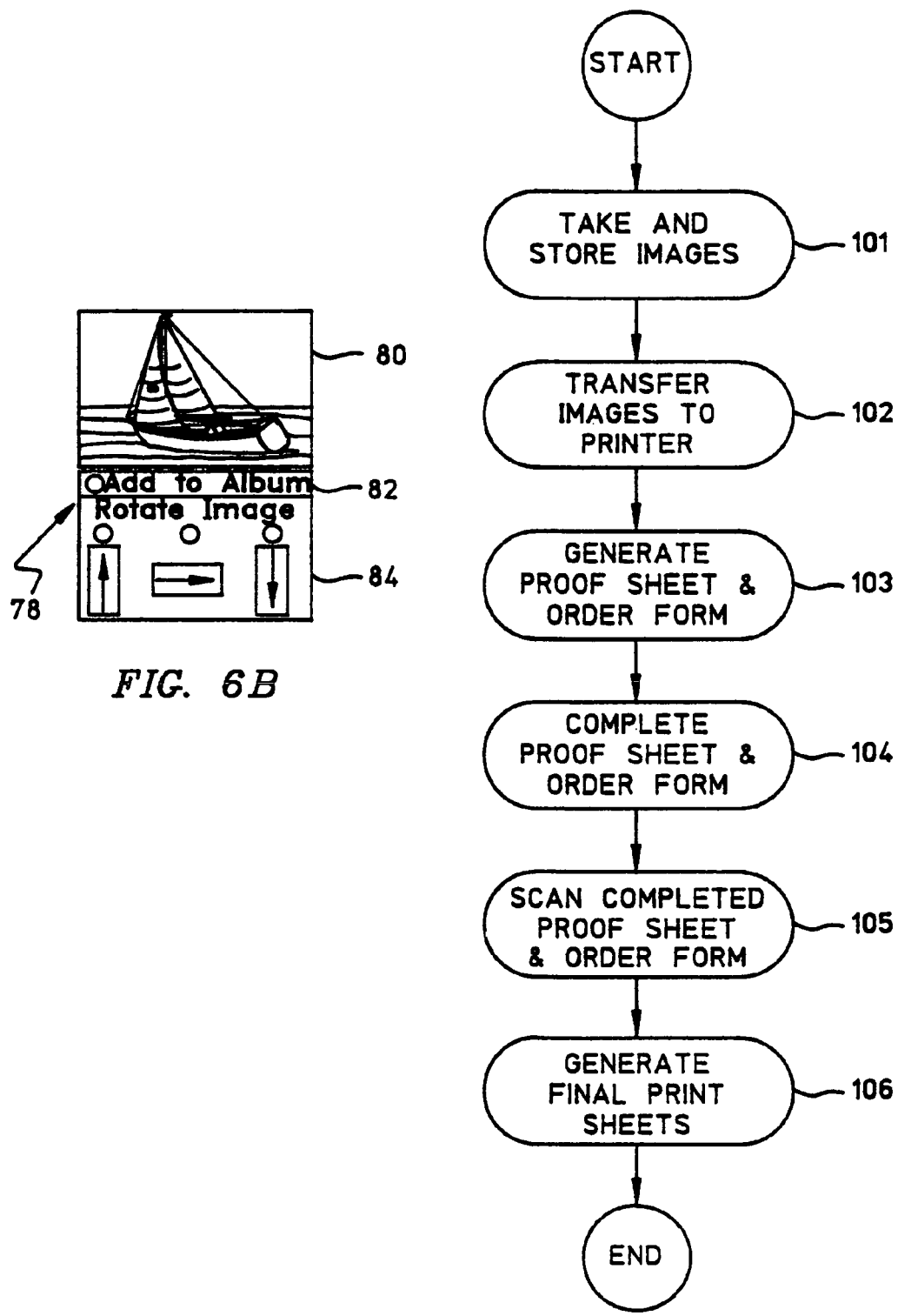
FIG. 7 is a flow diagram of the basic method of the method of the present invention for enabling a user to select and print digitally stored images.

In accordance with the present invention a method is also provided for enabling a user to select and print digitally stored images. Referring to FIG. 7, the method involves the following steps. The first step involves taking and storing digital still representations of a plurality of images. The second step 102 of the method involves transferring the digital still representations of the plurality of images to a printer capable of generating graphical representations of selected ones of the plurality of images on a preselected print media The third step 103 of the method involves generating with the printer a combination proof sheet and order form including a graphical representation of at least one of the images and a plurality of image selection and/or image enhancement user designation areas. The fourth step 104 of the method involves completing at least one of the user designation areas on the combination proof sheet and order form. The fifth step 105 of the method involves using the printer to read the combination proof sheet and order form to determine the user designation areas completed by the user. The sixth and final step 106 of the method involves generating with the printer at least one final print sheet with the images and enhancements designated by the user on the combination proof sheet and order form.

FIG. 7 illustrates only a very top level view of our method. It will be understood that there are a wide range of subroutines and options that can be followed in selecting and printing digitally stored images. For example, the combination proof sheet and order form 22 of FIG. 3 could first be printed, completed, re-inserted into the ink jet printer 14 and scanned. The printer could then print a half dozen custom forms 58 (FIG. 4) which could then be completed and fed through the inkjet printer 14 in succession with final print images being printed in succession as ordered. Thereafter, the album form 72 (FIG. 6) could be completed and scanned.

Our invention thus provides a system and method for enabling a DSC user to quickly and easily decide what images to print, what size to print them in, and the number of prints of each image that are to be printed. The order form technique that we have developed is greatly advantageous in that it eliminates the need for the user to connect the DSC to a PC, while at the same time eliminating the need for a complicated and expensive GUI on the printer. Many DSC users are well familiar with filling out forms that include brief word instructions and bubbles for making selections in other aspects of every day life such as standardized test taking, survey responses, mail order catalog forms and the like. Our invention has the advantage of minimizing the amount of paper, ink and toner that would otherwise be consumed in prior camera-direct-to-printer systems which typically require all images to be printed. Our invention farther has the added benefit of allowing sophisticated color photographic prints to be "ordered" quickly and easily, while at the same time being environmentally friendly by eliminating the use of developers and other chemicals associated with conventional silver halide photography.

While we have described preferred embodiments of our system and method for enabling a user to select and print digitally stored images, it will be apparent to those skilled in the art that our invention can be modified in both arrangement and detail. For example, as already eluded to, the layout, content, and functionality of the order forms can be greatly varied. Our order forms could also be used with the developing of traditional silver-halide film images, allowing user completion via facsimile or e-mail transmissions. Therefore, the protection afforded our invention should only be limited in accordance with the scope of the following claims.

We claim:

1. A printer for enabling a user to select and print a plurality of digitally stored images accessible by the printer, comprising:
    a digital print mechanism configurable by program logic to generate a combination proof sheet and order form having graphical representations of selected ones of the plurality of digitally stored images and a plurality of user designation areas;
    a scanner mechanism configurable by program logic to detect and interpret at least one user-completed one of the user designation areas after the form has been inserted into the scanner mechanism; and
    program logic configured to cause the digital print mechanism to generate at least one final print sheet having a graphical representation of at least one of the digitally stored images in accordance with the at least one detected and interpreted user-completed one of the user designation areas.

2. The printer of claim 1, wherein the form is asserted into the scanner mechanism by reinserting the form into an input/output tray of the printer.

3. The printer of claim 1, comprising:
a data transfer interface configurable to receive the digitally stored images, the interface selected from the group consisting of a memory card reader and at least one I/O port.

4. The printer of claim 1, wherein the graphical representations are made up of microscopic pixels.

5. The printer of claim 1, wherein the digital print mechanism is selected from the group consisting of a laser print mechanism, an ink jet print mechanism, a dot matrix print mechanism, a dye sublimation print mechanism, and a thermal print mechanism.

6. The printer of claim 1, wherein the graphical representations of the selected ones of the plurality of images include thumbnail images.

7. The printer of claim 6, wherein one of the user designation areas is located on the combination proof sheet and order form adjacent to and is associated with a corresponding one of the thumbnail images.

8. The printer of claim 1, wherein the user designation areas to be user-completed include locations markable by the user with a marking implement.

9. The printer of claim 8, wherein at least some of the markable locations comprise bubble-shaped regions.

10. The printer of claim 8, wherein at least some of the markable locations comprise at least one of vertical slots between adjacent vertical bars and discrete bounded regions.

11. The printer of claim 1, wherein the combination proof sheet and order form includes user readable printed indicia.

12. The printer of claim 1, wherein the scanner mechanism is an optical scanner.

13. The printer of claim 12, wherein the optical scanner is selected from the group consisting of a photo detector array, a paper edge sensor, a media type sensor, and an ink jet pen activation energy sensor.

14. The printer of claim 1, wherein the scanner mechanism is selected from the group consisting of an electrical scanner and a mechanical scanner.

15. The printer of claim 1, wherein a particular one of the user designation areas is associated with a corresponding one of the digitally stored images.

16. The printer of claim 15, wherein the particular one of the user designation areas is adjacent the graphical representation of the corresponding one of the digitally stored images.

17. The printer of claim 1, wherein a particular one of the user designation areas is associated with a corresponding plurality of the digitally stored images.

18. The printer of claim 1, wherein a particular one of the user designation areas is markable for specifying at least one of an image selection, an image cropping, an image brightness, an image rotation, a print size, and a print quantity, and a picture storage selection.

19. The printer of claim 3, where the digitally stored images are received from at least one of a flash memory card, a floppy diskette, a direct data link and a wireless data link.

20. The printer of claim 1 wherein the digital print mechanism is further configurable by stored program logic to generate a custom proof sheet and order form having at least one graphically represented image and user designation cropping areas along adjacent side edges of the image, the user designation cropping areas markable by the user to graphically indicate two-dimensional cropping positions for the image.

21. The printer of claim 1, comprising:
a memory configured to store the digitally stored images.

22. The printer of claim 11 wherein the printer further includes program logic for generating an album form including user designation areas for selecting from a plurality of different image borders.

23. A printer for enabling a user to select and print a plurality of digitally stored images accessible by the printer, the printer comprising:
a digital print mechanism capable of generating graphical representations of selected ones of the plurality of digitally stored images and a plurality of user designation areas on a print medium;
a scanner mechanism capable of detecting at least one user designation area on the print medium after it has been completed by a user;
program logic configured to cause the digital print mechanism to generate a combination proof sheet and order form that incorporates at least one of the plurality of images and the plurality of user designation areas;
program logic configured to cause the scanner mechanism to scan the combination proof sheet and order form after at least one of the plurality of user designation areas has been completed by a user and the combination proof sheet and order form has been inserted into the scanner mechanism;
program logic configured to interpret one or more of the user designation areas completed by the user and detected by the scanner mechanism; and
program logic configured to cause the digital print mechanism to automatically generate at least one final print sheet having a graphical representation of at least one of the digitally stored images in response to the detection and interpretation of, and in accordance with the user designation areas completed by the user.

24. The printer of claim 23, comprising:
a data transfer interface configurable to receive the plurality of digitally stored images.

25. A system for enabling a user to select and print a plurality of digitally stored images, the system comprising:
a digital printer capable of generating graphical representations of selected ones of the plurality of images and a plurality of user designation areas on a print medium;
a scanner capable of detecting at least one user designation area on the print medium after it has been completed by a user;
program logic configured to cause the digital printer to generate a combination proof sheet and order form that incorporates at least one of the plurality of images and the plurality of user designation areas;
program logic configured to cause the scanner to scan the combination proof sheet and order form after at least one of the plurality of user designation areas has been completed by a user and the combination proof sheet and order form has been inserted into the scanner;
program logic configured to interpret one or more of the user designation areas completed by the user and detected by the scanner; and
program logic configured to cause the digital printer to generate at least one final print sheet having a graphical representation of at least one of the digitally stored images in accordance with the user designation areas completed by the user.

26. A system for enabling a user to select and print a plurality of digitally stored images, comprising:
- a digital printer configurable by stored program logic to generate a combination proof sheet and order form having graphical representations of selected ones of the plurality of images and a plurality of user designation areas;
- a scanner coupled to the printer and configurable by stored program logic to detect and interpret at least one user-completed one of the user designation areas after the form has been inserted into the scanner; and
- program logic configured to cause the digital printer to generate at least one final print sheet having a graphical representation of at least one of the digitally stored images in accordance with the at least one detected and interpreted user-completed one of the user designation areas.

27. A method for selecting and printing digitally stored images available to a digital printer, comprising:
- generating with the digital printer a combination proof sheet and order form having a graphical representation of at least one of the images and a plurality of user designation areas;
- scanning with the digital printer the combination proof sheet and order form after a user has completed at least one of the user designation areas thereon;
- detecting and interpreting the completed user designation areas with the digital printer; and
- automatically printing with the digital printer, responsive to the detecting and interpreting, at least one final print of at least one of the digitally stored images in accordance with the completed user designation areas.

28. The method of claim 27, comprising:
- automatically detecting a re-insertion into the printer of the user-completed combination proof sheet and order form; and
- initiating the detecting and interpreting in response thereto.

29. The method of claim 27, wherein the plurality of user designation areas includes at least one of an image selection user designation area and an image enhancement user designation area.

30. The method of claim 27, comprising:
- generating an identity marker on the combination proof sheet and order form, the identity marker uniquely associated with at least one of the graphically represented images; and
- scanning the identity marker using the printer so as to confirm that the at least one of the graphically represented images is available to the printer, before printing the at least one final print.

31. The method of claim 30, wherein the scanning the identity marker comprises:
- comparing the identity marker to a code associated with the at least one of the graphically represented images.

32. The method of claim 30, comprising:
- preventing the printing if the at least one of the graphically represented images is unavailable to the printer.

33. The method of claim 30, wherein the identity marker comprises a pattern of printed and unprinted locations.

34. The method of claim 27, wherein the graphical representation of at least one of the images includes an array of thumbnail images.

35. The method of claim 27, wherein the completed user designation areas include locations marked by the user with a marking implement.

36. The method of claim 35, wherein the scanning includes detecting with an optical scanner the locations marked by the user.

37. The method of claim 27, wherein the user designation areas comprise bounded regions markable by a user with a marking implement.

38. The method of claim 27, wherein the user designation areas comprise regions markable by a user by a process selected from the group consisting of punching out holes therein, applying a sticker thereto, and applying a conductive marker thereto.

39. The method of claim 27, comprising:
- generating with the printer at least one custom proof sheet and order form with user designation areas for enhancing a user-selected image.

40. The method of claim 39, wherein the enhancing the user-selected image includes cropping the user-selected image.

41. The method of claim 27, wherein a particular one of the user designation areas is associated with a corresponding one of the digitally stored images.

42. The method of claim 41, wherein the particular one of the user designation areas is generated adjacent the graphical representation of the corresponding one of the digitally stored images.

43. The method of claim 27, wherein a particular one of the user designation areas is associated with a corresponding plurality of the digitally stored images.

44. The method of claim 27, wherein a particular one of the user designation areas is markable for specifying at least one of an image selection, an image cropping, an image brightness, an image rotation, a color balance, a superimposed picture date, a print size, a print quantity, and a picture storage selection.

45. The method of claim 44, wherein the particular one of the user designation areas is associated with at least one of the digitally stored images.

46. The method of claim 27, wherein a subset of the user designation areas defines image borders, and wherein one of the subset is markable for selecting one of the image borders for the corresponding at least one of the digitally stored images.

47. The method of claim 27, wherein a particular one of the user designation areas is markable for specifying an image layout on the at least one final print.

48. The method of claim 27, comprising:
- storing at least one of the digitally stored images in a memory of the printer.

49. The method of claim 27, comprising:
- storing at least one of the digitally stored images in a computer connected to the printer.

50. The method of claim 27, wherein the detecting and interpreting comprises:
- identifying the at least one of the digitally stored images from the completed user designation areas.

51. The method of claim 27, comprising:
- generating with the printer, responsive to the scanning, at least one custom form having an additional graphical representation of one of the images and an additional plurality of user designation areas;
- scanning with the printer the at least one custom form after the user has completed at least one of the additional user designation areas thereon; and
- wherein the detecting and interpreting includes detecting and interpreting the completed user designation areas on the combination proof sheet and order form and the at least one custom form.

52. A method for selecting and printing digitally stored images, comprising:
- receiving in a digital printer a plurality of the digitally stored images;
- generating with the digital printer a combination proof sheet and order form that incorporates a graphical representation of at least one of the images and a plurality of user designation areas;
- receiving with the digital printer the combination proof sheet and order form after a user has completed at least one of the user designation areas thereon and the form has been re-inserted into the digital printer;
- utilizing the digital printer to detect and interpret the completed user designation areas on the re-inserted combination proof sheet and order form; and
- automatically generating with the digital printer, responsive to the detection and interpretation of the completed user designation areas, at least one final print sheet having a graphical representation of at least one of the digitally stored images in accordance with the completed user designation areas.

53. A method for enhancing a digitally stored image available to a digital printer, comprising:
- generating with the digital printer a form having at least one graphical representation of the digitally stored image, and a plurality of user designation areas each associated with at least one of the graphical representations and indicative of a particular image enhancement applicable to the image;
- scanning the form with the digital printer after a user has completed at least one of the user designation areas;
- detecting and interpreting the completed user designation areas with the digital printer; and
- automatically enhancing, responsive to the detecting and interpreting, the digitally stored image with the digital printer in accordance with the completed user designation areas.

54. The method of claim 53, comprising:
- automatically detecting a re-insertion into the printer of the user-completed form; and
- initiating the detecting and interpreting in response thereto.

55. The method of claim 53, comprising:
- printing at least one final print of the enhanced digitally stored image.

56. The method of claim 53, wherein the form has a plurality of graphical representations of the digitally stored image and at least one user designation area associated with each graphical representation, each graphical representation prospectively indicative of the effect of the enhancement.

57. The method of, claim 56, wherein the enhancement is selected from the group consisting of a brightness selection and a color balance selection.

58. The method of claim 53, wherein the form has a single graphical representation of the digitally stored image and a set of user designation areas associated with the graphical representation, and wherein the completed ones of the set of user designation areas collectively define the enhancement.

59. The method of claim 58, wherein the enhancement is an image cropping selection.

60. The method of claim 59, wherein the set of user designation areas comprises:
- a vertical subset of user designation areas adjacent a vertical edge of the graphical representation; and
- a horizontal subset of user designation areas adjacent a horizontal edge of the graphical representation.

61. The method of claim 60, wherein the image cropping selection is defined by the completion of two user designation areas in the vertical subset denoting a first cropping dimension and two user designation areas in the horizontal subset denoting a second cropping dimension.

62. The method of claim 61, wherein the digitally stored image has a print size, and wherein the first and second cropping dimensions are adjusted to best-fit the image to the print size.

63. The method of claim 61, wherein the digitally stored image has a print size, and wherein the print size is enlarged based on the first and second cropping dimensions.

64. The printer of claim 1, wherein the program logic configured to cause the digital print mechanism to generate at least one final print sheet is configured to cause the digital print mechanism to automatically generate the at least one final print sheet in response to the scanner mechanism detecting and interpreting the at least one user-completed one of the user designation areas.

65. The system of claim 25, wherein the program logic configured to cause the digital printer to generate at least one final print sheet is further configured to cause the digital printer to automatically generate the at least one final print sheet in response to the interpretation of the user designation areas completed by the user and detected by the scanner.

* * * * *

UNITED STATES PATENT AND TRADEMARK OFFICE
CERTIFICATE OF CORRECTION

PATENT NO. : 8,228,527 B2  
APPLICATION NO. : 10/821490  
DATED : July 24, 2012  
INVENTOR(S) : Kirt A. Winter et al.

Page 1 of 1

It is certified that error appears in the above-identified patent and that said Letters Patent is hereby corrected as shown below:

In column 9, line 4, in Claim 2, delete "asserted" and insert -- inserted --, therefor.

In column 10, line 38, in Claim 23, delete "with" and insert -- with, --, therefor.

In column 11, line 53, in Claim 31, after "wherein" delete "the".

In column 14, line 4, in Claim 57, delete "of," and insert -- of --, therefor.

Signed and Sealed this  
Twenty-second Day of January, 2013

David J. Kappos  
*Director of the United States Patent and Trademark Office*